United States Patent [19]

Oshiba et al.

[11] Patent Number: 5,438,563

[45] Date of Patent: Aug. 1, 1995

[54] OPTICAL INFORMATION RECORDING/REPRODUCING DEVICE WHICH SIMULTANEOUSLY REPRODUCES INFORMATION FROM PLURAL TRACKS AND OPTICAL INFORMATION RECORDING/REPRODUCING METHOD

[75] Inventors: Mitsuo Oshiba, Hachioji; Takefumi Sakurada, Akishima; Naoaki Tani; Takumi Sugaya, both of Hachioji; Takao Rokutan, Higashimurayama, all of Japan

[73] Assignee: Olympus Optical Co., Ltd., Tokyo, Japan

[21] Appl. No.: 106,717

[22] Filed: Aug. 16, 1993

[30] Foreign Application Priority Data

Aug. 19, 1992 [JP] Japan .................................. 4-220474
Sep. 7, 1992 [JP] Japan .................................. 4-238407

[51] Int. Cl.$^6$ .............................................. G11B 7/08
[52] U.S. Cl. ...................... 369/124; 369/120; 369/100
[58] Field of Search ............... 369/44.37, 124, 112, 369/44.25, 122, 100, 120

[56] References Cited

U.S. PATENT DOCUMENTS

| | | | |
|---|---|---|---|
| 4,730,293 | 3/1988 | Pierce et al. | 369/122 |
| 5,177,724 | 1/1993 | Gelbart | 369/44.37 |
| 5,267,226 | 11/1993 | Matsuoka et al. | 369/44.37 |
| 5,293,365 | 3/1994 | Rokutan | 369/44.25 |
| 5,315,575 | 5/1994 | Akatsuka | 369/112 |

FOREIGN PATENT DOCUMENTS

2-141932 5/1990 Japan .

*Primary Examiner*—Scott J. Sugarman
*Assistant Examiner*—Kim-Kwok Chu
*Attorney, Agent, or Firm*—Armstrong, Westerman, Hattori, McLeland & Naughton

[57] ABSTRACT

An optical information recording/reproducing device is constituted of a focus control circuit connected to a controller, a tracking control circuit, a data processing circuit, and a card feed control circuit. The data processing circuit includes a plurality of I/V converters for converting signals received by a plurality of signal reproducing light receiving elements arranged to an optical detector into current/voltage, and a plurality of binary circuits each for converting the output from the I/V converters into a binary signal in a reference level. The data processing circuit includes a selector for selecting at least two outputs of a plurality of binary circuits. The data processing circuit includes a plurality of bit-clock producing circuits and a plurality of demodulation circuits. The bit-clock producing circuits produce bit clocks based on binary signals originated from selectors and a plurality of binary circuits which are not connected to the selectors. The demodulation circuits executes sampling the two binary signals in accordance with bit clocks and executes data demodulation using the sampled results. The data processing circuit includes a plurality of memories storing demodulated results from the plurality of demodulation circuits.

20 Claims, 10 Drawing Sheets

OPTICAL MEMORY CARD MOVING DIRECTION

FIG.5

OPTICAL MEMORY CARD MOVING DIRECTION

OPTICAL INFORMATION RECORDING/REPRODUCING DEVICE WHICH SIMULTANEOUSLY REPRODUCES INFORMATION FROM PLURAL TRACKS AND OPTICAL INFORMATION RECORDING/REPRODUCING METHOD

BACKGROUND OF THE INVENTION

1. Field of the Invention

The present invention relates to an optical information recording/reproducing device wherein information is simultaneously reproduced by irradiating an optical beam to a plurality of tracks, and an optical information recording/reproducing method.

2. Related Art Statement

Optical recording media such as optical cards include a plurality of tracks arranged in parallel. An optical information recording/reproducing device includes an optical head for optically recording/reproducing information to/from an optical card and performs an information recording/reproducing operation by reciprocating an optical recording medium in the direction of tracks of the optical recording medium and reciprocating an optical head perpendicularly to the direction of the tracks.

Generally, as a conventional optical information recording/reproducing device, a single track reading type information recording/reproducing device which irradiates a single light emitted from an optical head onto a single track and reads out information per track has been known. However, such a device cannot increase its reproducing rate because the reproducing rate of information recorded on a track is determined by the relative velocity between the optical head and the optical recording medium.

In order to solve such a problem, an optical information recording/reproducing device of the type which irradiates light emitted from an optical head onto a plurality of tracks and simultaneously read out information from the plurality of tracks has been considered. For example, Japanese Laid-open Patent Publication No. 2-141932 discloses a device which samples binary signals from light receiving elements arranged on a plurality of tracks at high-frequency clocks, stores the signals in a memory, and performs a signal processing, thus realizing a small-sized data processing system.

In an optical card, the recording pit on a track has a length of 2 $\mu$m and less. Generally, 1-pit has a length of about 2 fm after modulation. Since the data recording track has a length of about 60 mm, one track can record data of about 30 kbit($=60$ mm/2 fm) after modulation. The above prior art discloses that suppressing jitter due to a sampling error to less than 5% results in no adverse effect on data reproduction. If the reciprocating rate is about 640 mm/sec, the passing time per bit is 3.125 $\mu$ sec.

In consideration of the above facts, in order to suppress the jitter to about 5%, if the binary signals are sampled at a periodic sampling clock of about 156 (3.125 $\mu$ sec$\times$20) nsec, a memory with about 600 kbit (30 kbit$\times$20) per track is needed. Such a large capacity memory is usually used as a DRAM memory. Since the access time is about 100 nsec, which is slower than that of a SRAM, the cycle time is about 150 nsec.

In the above device which reads sampled binary signals in a memory and executes a demodulation process track by track, the memory reading time of 150 nsec per bit equals to the data reading time of an optical card.

Hence, for example, in the three-track simultaneous reading device, if the rate of the reciprocating motion is about 640 mm/sec, the total data demodulation time of three tracks takes triple as much as 93.8 msec (60 mm/640 mm/sec). The three-track simultaneous reading device is effective in the case of a slower reciprocating rate and is effective when high-speed memory will be available at lower price in the future.

However, there is a disadvantage in that it is difficult to realize a plurality of tracks reading type optical information reproducing device with a high data reading speed when the relative moving rate between an optical head and an optical card is relatively high, and the existing large capacity, high speed memories are expensive.

Since the conventional optical information recording/ reproducing device performs what is known as a blank check when a track to be recorded is scanned prior to recording information on an optical medium and it is judged whether the track is readable (blank) or not, normal information writing probability is improved.

However, in the single light source-type optical information recording/reproducing device where recording and reproducing corresponds to varying the intensity of a single beam, the recording operation and the reproducing operation cannot be performed simultaneously and in parallel. For that reason, when a normal information recording is performed on one track, at least two scanning operations are needed for blank checking and information recording. Therefore, there is a problem in that it is difficult to increase an effective recording speed at high speed when a continuous recording operation is performed on a plurality of adjacent tracks or tracks connected to each other.

OBJECTS AND SUMMARY OF THE INVENTION

The present invention has been made to overcome the above problems in the prior art. An object of the present invention is to provide an optical information recording/reproducing device of a plurality of tracks reading type which enables a high speed information reading to be performed even if the relative moving velocity between an optical head and an optical recording medium is at a high speed.

Another object of the present invention is to provide an optical information recording/reproducing device and method of a plurality of tracks reading type which enables information recording and/or information reproducing and blank checking to be performed through a single scanning and without depending on a moving direction of an optical recording medium.

Still another object of the present invention is to provide an optical information recording/reproducing device and method of a plurality of tracks reading type which can improve the effective recording speed when a sequential recording operation is executed on a plurality of adjacent or connected tracks.

In order to achieve the above objects, an optical information recording/reproducing device is provided, the device comprises an optical head including a reproducing light source for irradiating a first reproducing optical beam onto n (n$>$1) tracks of an optical recording medium having a plurality of tracks, the tracks being in an information recordable state or an information recorded state, and first light receiving detecting means for receiving a return light of the reproducing optical beam from the optical recording medium and issuing information of the m ($n \geq m > 1$) track information as m detection signals; scanning means for moving the optical recording medium and the optical head relatively to each other; and m first signal processing means for processing the m detection signals from the first light receiving detecting means when the optical medium and the optical head move relatively to each other by the scanning means.

In the above mentioned optical information recording/reproducing device, the optical information recording/reproducing method is suited for the optical information recording/reproducing device wherein the first signal processing means comprises blank checking means for executing a blank check of the tracks of m in accordance with the detection signals of m from the first light receiving detecting means of m; and blank check memory means for storing the results of the blank check executed by the blank checking means. This method includes the first step of judging whether the blank check of the track has completed, the track on which information is recorded using the recording beam; the second step of referring to a result of a blank check of the track when it is judged that the check has been completed at the first step, the result being stored in the blank check memory means; the third step of judging whether the track is blank based on the result of the blank check of the track; and the fourth step of recording information onto the track without scanning for a blank check when the third step has judged that the track is blank.

The present invention will hereinafter be explained in more detail with reference to the attached drawings, wherein:

BRIEF DESCRIPTION OF THE DRAWINGS

FIGS. 1 to 8 pertain to the first embodiment of the present invention;

FIGS. 9 to 13 pertain to the second embodiment of the present invention;

DETAILED DESCRIPTION OF THE PREFERRED EMBODIMENTS

Preferred embodiments according to the first embodiment of the present invention will be described below in accordance with the attached drawings.

Figure 1A:
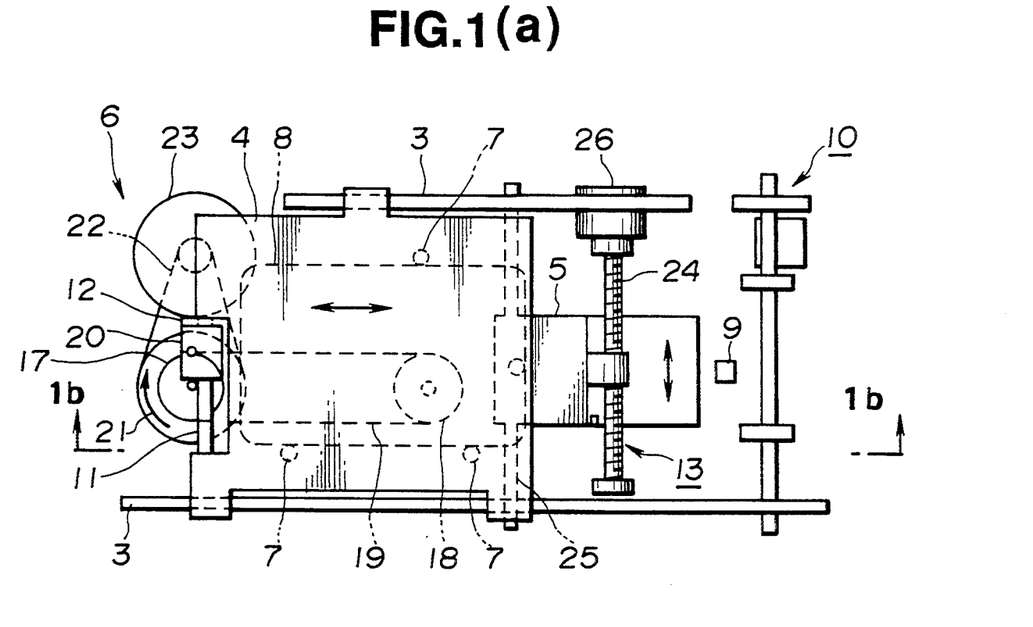
FIG. 1(a) is a plan view showing the interior structure of an optical recording/reproducing device according to a first embodiment of the present invention.
Figure 1B:
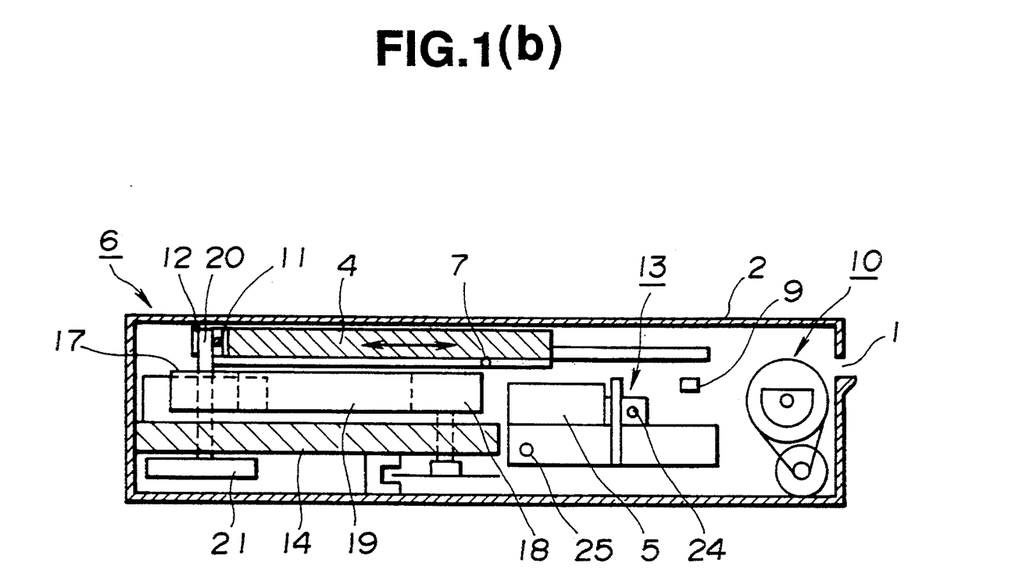
FIG. 1(b) is a cross-sectional view of the device of FIG. 1(a) taken on line A—A.

In the card drive mechanism of an optical recording/reproducing device according to the present embodiment, as shown in FIGS. 1(a) and 1(b), which is a cross-section view taken on line A—A in FIG. 1(a), a holder 4, which houses an optical card 8 inserted from a card insertion slit 1, is supported reciprocatively along two guide shafts 3 arranged in parallel. An optical head 5 is arranged on the card insertion slit side (on the right side in FIG. 1(b)) and below the transfer route of the holder 4. A card feed mechanism 6 is arranged on the side opposite to the slit side (on the left side in FIG. 1(b)). A card holding member 7 is formed below the holder 4 and has a height of the card insertion slit 1.

On the card insertion slit side, a detector 9 for detecting the insertion of the optical card 8 inserted and a card load/eject mechanism 10 operated based on a signal from the detector 9 to load and eject automatically the optical card 8 to the card holding member 7 of the holder 4 are arranged.

A guide shaft 11 is arranged on the rear side of the holder 4 and perpendicularly to the traveling direction of the holder 4. A slide member 12 is movably arranged on the guide shaft 11.

In the card feed mechanism 6, a pin 20 is mounted vertically at a proper position on a belt 19 wound on pulleys 17 and 18 and what is coupled with the slide member 12. A pulley 21 is supported on the shaft and under the pulley 17. A driving motor 23 is coupled with the pulley 21 by way of drive means 22 such as a belt.

A head feed mechanism 13 of the optical head 5 is mounted on a lead screw 24 and a guide shaft 25 arranged in the direction perpendicular to the traveling direction of the holder 4. The lead screw 24 is mounted on the guide shaft 25 of a head feed motor 26 which is rotatable bidirectionally. When the head feed motor 26 operates, the optical head 5 is moved in the direction perpendicular to the traveling direction of the optical card 8 by the guide shaft 25 and the lead screw 24, so that a recording information track of the optical card 8 is accessible.

In an operation of the optical information recording/reproducing device, the holder 4 is in a card insertion stand-by state near the card insertion slit (not shown). When the detector 9 detects the insertion of the optical card 8, the card load/eject mechanism 10 operates. The card load/eject mechanism 10 automatically loads the optical card 8 inserted into the card holding member 7 in the holder 4.

The drive motor 23 of the card feed mechanism 6 operates sequentially, thus moving the belt 19. At this time, the pin 20 mounted on the belt 19 drags the holder 4 along the guide shaft 3 by way of the slide member 12.

When the connecting pin 20 reaches the outer periphery of the pulley 17, the connecting pin 20 slides the slide member 12 horizontally with respect to the holder 4, thus turning the pulley 17 semicircularly and moving on a backward side. In the similar manner to that in the forward movement, the connecting pin 20 moves the holder 4 backwards by way of the slide member 12 and along the guide shaft 3. Hence the holder 4 performs a reciprocating movement by the unidirectional continuous rotation of the drive motor 23. When the holder 4 moves backwards, the information recording track 28 of the optical card 8 moves relatively to the optical head 5 to execute an information recording and reproducing processing. When the holder 4 returns to its original position, the head feed motor 26 operates cooperatively and allows the track access operation to be performed by the guide shaft 25 and the lead screw 24, thus repeating a similar card feeding operation.

Figure 2:
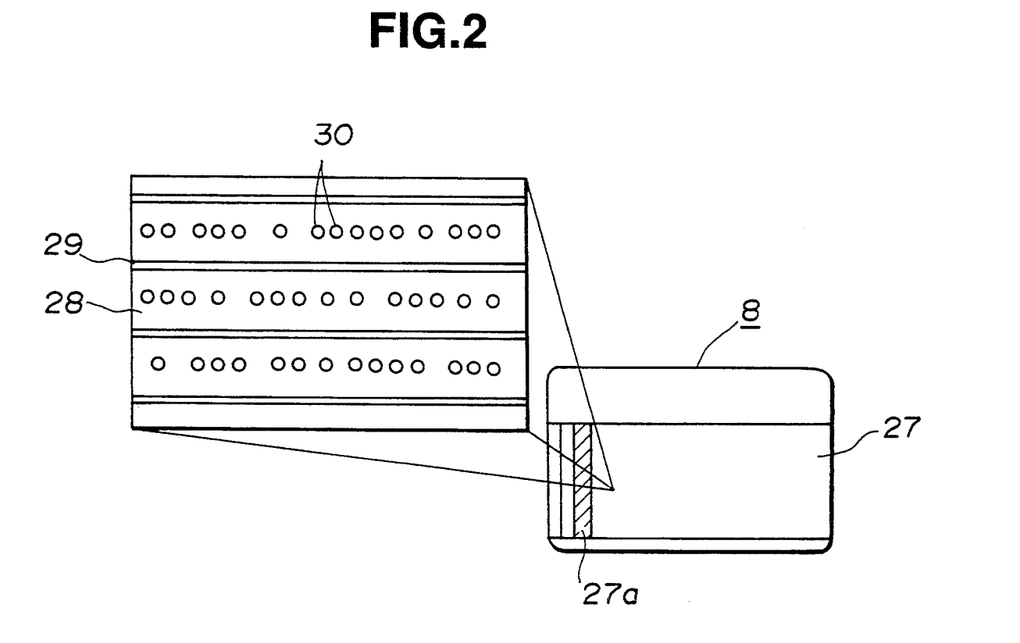
FIG. 2 is a plan view showing an enlarged information recording portion of the optical card according to the present invention.

The optical card 8, as shown in FIG. 2, includes in the surface thereof an optical information recording portion 27 in a strip form. A plurality of information recording tracks 28 formed on the information recording portion 27 are subjected to information recording and reproducing when the light from the optical head 5 is irradiated to the tracks 28. In the drawings, numeral 29 represents a track guide for tracking the optical head 5 to the information recording track 28, and 30 represents a pit formed on the information recording track 28 constituting an information unit. The pit 30 is formed by producing a thermal irreversible change in tile information recording portion 27 through a light irradiation. In this embodiment, the pit 30 has a lower light reflectivity than that of the periphery of the pit 30. A track ID 27a for recording previously recorded information such as track numbers is arranged at one end of the information recording portion 27.

Figure 3:
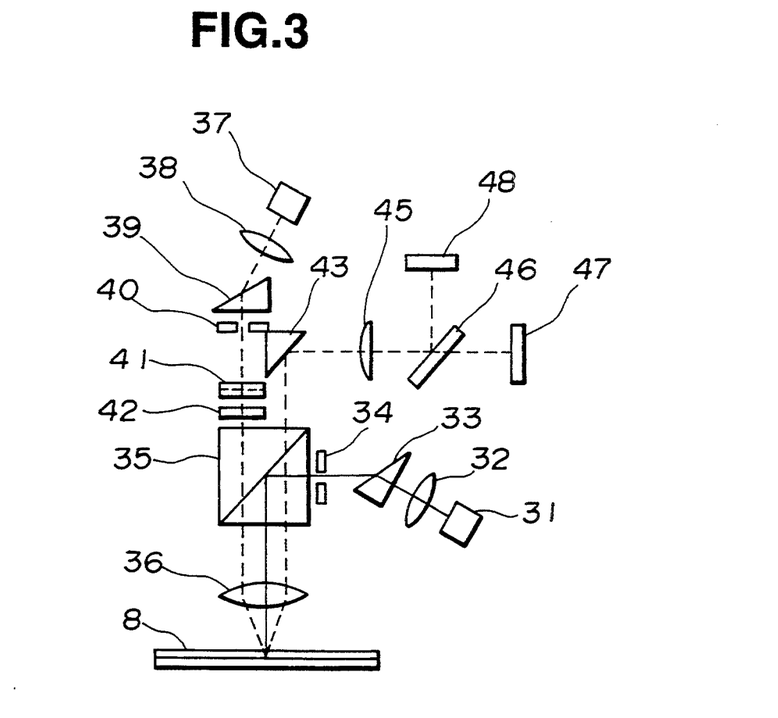
FIG. 3 is a structural view showing the optical system of the optical head shown in FIG. 1, the head recording and reproducing onto an optical card where the traveling direction varies relatively.

In the optical head 5, as shown in FIG. 3, the optical beam originated from a semiconductor laser 31 acting as a light source for information recording is converted to a substantial parallel beam having an oval form by a collimator lens 32. The parallel beam is restored to being a substantially round beam by reducing only the component in tile longitudinal direction by means of a restoring prism 33. The restored beam is irradiated on the optical card 8 by a round spot 34 to make a predetermined spot size of the parallel beam and enters a polarizing beam splitter 35 as a recording round beam.

The recording polarizing round beam is formed of substantially a S-polarizing component due to the property of the semiconductor laser 31. Most recording round beams are reflected by tile reflection surface of the polarizing beam splitter 35 and input to the optical axis of an objective lens 36. The light is condensed by the objective lens 36 to form a round spot on the optical card 8, so that its energy density is enhanced locally to cause a thermal irreversible change in the recording layer of the optical card 8, thus forming a recording pit.

On the other hand, the optical beam originated from a semiconductor laser 37 arranged as an information reproducing light source is converted substantially to a parallel beam in oval form by passing the beam through the collimator lens 38. The parallel beam is shaped to have a nearly round form by enlarging only the component in the minor axial direction of the oval by a shaping prism 39. The round beam is further irradiated to a predetermined spot diameter on the optical card 8 using a round iris 40 and then irradiating to a plano-concave cylindrical lens 41.

The optical beam is subjected to a deflection effect in one direction on the surface perpendicular to the optical axis by using the plano-concave cylindrical lens 41 and becomes a beam diverging slightly in the direction. A diffraction grating 42 separates the beam to the 0-order diffraction light and two beam of the primary diffraction light by the diffraction grating 42. Then the cylindrical lens 41 and the diffraction grating 42 are arranged in such a manner that the optical beam diverging direction from the cylindrical lens 41 makes substantially a right angle with the diffraction direction by the diffraction grating 42.

Since the three optical beams split by the diffraction grating 42 are formed of substantially P-polarized light components because of the property of the semiconductor laser, most components are passed through the polarizing beam splitter 35 by the objective lens 36 to form three spots on the optical card 8. Since the cylindrical lens 41 diverges the beams, the diverged optical beam spots are formed on the optical card 8.

Figure 4:
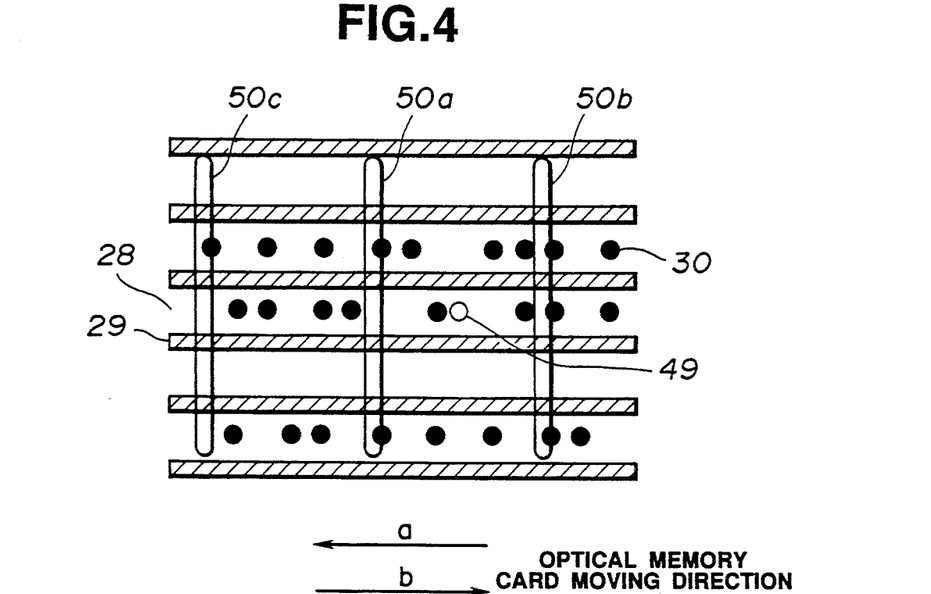
FIG. 4 is an explanatory view describing a recording optical beam spot and a reproducing optical beam spot on an optical card.

FIG. 4 is a diagram showing the relationship between a recording optical beam spot 49 formed on the optical card 8 and spots 50a, 50b, and 50c of the diffraction light of the reproducing optical beam. As shown in FIG. 4, the diffraction light spots 50a, 50b, and 50c of the reproducing optical beam are arranged so as to position the recording optical beam spot 49 between the spot 50a of the O-order diffraction light of the reproducing optical beam and the spots 50b or 50c of the primary diffraction light. During an optical head assembling and adjusting, this arrangement is adjusted by providing a relative angle difference between the optical axis of a recording optical beam before entering the objective lens 36 and the optical axis of a reproducing optical beam. The cylindrical lens 41 is arranged in such a manner that the enlarging direction of the reproducing optical beam spots 50a, 50b, and 50c on the optical card 8 is substantially perpendicular to the extending direction of the tracks 28. As a result, information on a plurality of tracks 28 can be obtained simultaneously.

Referring to FIG. 3, spots 50a, 50b, and 50c of the diffraction light of a reproducing optical beam which are subjected to a light amount modulation based on the presence of the track guide 29 and pits 30 on the optical card 8 are reflected back rightly from, for example, the five tracks on the optical card 8. The reflected beams of light pass reversely through the objective lens 36 and introduced as nearly parallel light into the polarizing beam splitter 35. Since the optical beam is reflected rightly on the optical card 8, the reflection light is held substantially as a P-polarization light. Most components pass through the polarizing beam splitter 35 and are introduced into a reflection mirror 43. The components are reflected by the reflection mirror 43, condensed by a condenser 45, split by a half-mirror 46, and irradiated on the light receiving surfaces of a signal reproducing and tracking optical detector 47 and a focusing optical detector 48 to enlarge and project the spot image.

As described above, the reproducing optical beam is subjected to what is known as an out of axis focus detecting system where a beam enters an eccentric position out of the optical axis to the objective lens 36. For example, two-split light receiving elements (not shown) are arranged so as to detect the image shift of a reproducing optical beam spot due to focus deviation by means of the two-split light receiving elements.

Figure 5:
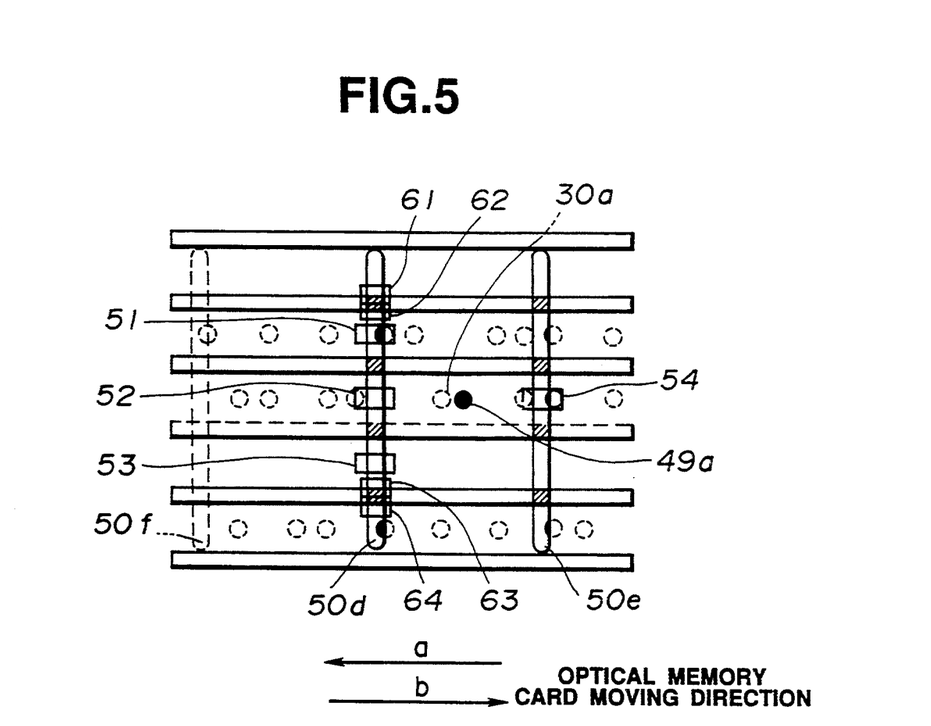
FIG. 5 is an explanatory view describing the layout of a light receiving element on an optical detector.

FIG. 5 is a diagram showing a recording optical beam spot image formed on the optical detector 47 and spot images of the O-order diffraction light and the primary diffraction light of a reproducing optical beam. Signal reproducing light receiving elements 51, 52, and 53 and tracking light receiving elements 61, 62, 63, and 64 are arranged on the optical detector 47.

The tracking light receiving elements 61, 62, 63, and 64 detect a change in a position of a track guide image due to a track deviation as a change in received light amount and produce a tracking error signal. According to the tracking error signal, the optical information recording/reproducing device executes a tracking control by using a tracking control circuit described later.

When enlarged and projected images 50d, 50e, and 50f of a reproducing optical beam are properly imaged on the signal reproducing light receiving elements 51, 52, and 53, respectively, with no track deviation and focus deviation, the signal reproducing light receiving elements 51, 52, and 53 detect, in light amount change, the presence or absence of pits on the three tracks by means of the O-order diffraction light spot 50a to output a reproducing signal.

A signal reproducing light receiving element 54 is arranged at a position where the image 50e corresponds to the spot 50b due to the primary diffraction light formed on the optical detector 47. When the enlarged and projected images 50d, 50e, and 50f of the reproducing optical beam are properly imaged on the signal reproducing light receiving element 54 with no track deviation and focus deviation, the signal reproducing light receiving element 54 detects a presence or absence of the pit in light amount change by means of the spot 50b of the primary diffraction light to output a reproducing signal.

During the information recording operation, when the optical card 8, as shown in FIG. 5, is moving in the direction of the arrow a (in a forward direction), the pit image 30a formed by tile recording optical beam spot 49 moves in the direction of the image 50f of the primary diffraction light spot 50c of the reproducing optical beam. When the pit has reached the position of the spot 50c, a change in light amount occurs in the signal reproducing light receiving element 52 in the optical detector 47. The light change results in a reproducing signal being obtained immediately after tile recording operation. A verify operation is executed based on the reproducing signal. Here numeral 49a represents an image on the optical detector 47 for the recording optical beam spot 49.

When the optical card 8 moves in the direction of the arrow b (in the reverse direction), the pit image 30a formed by the recording optical beam spot 49 moves in the direction of the image 50e of the primary diffraction light spot 50b of the reproducing optical beam. When the pit reaches the spot 50b, a change in light amount occurs in the signal reproducing light receiving element 54. A reproducing signal can be obtained due to the change in light amount immediately after recording. A verify operation is executed based on the reproducing signal.

Therefore, even if tile optical card 8 moves in the forward or reverse direction, a reproducing signal can be obtained immediately after recording. That is, a verify operation which checks the record quality can be performed no matter what the moving direction of the optical card 8, reciprocated with respect to the optical head 5 is.

Figure 6:
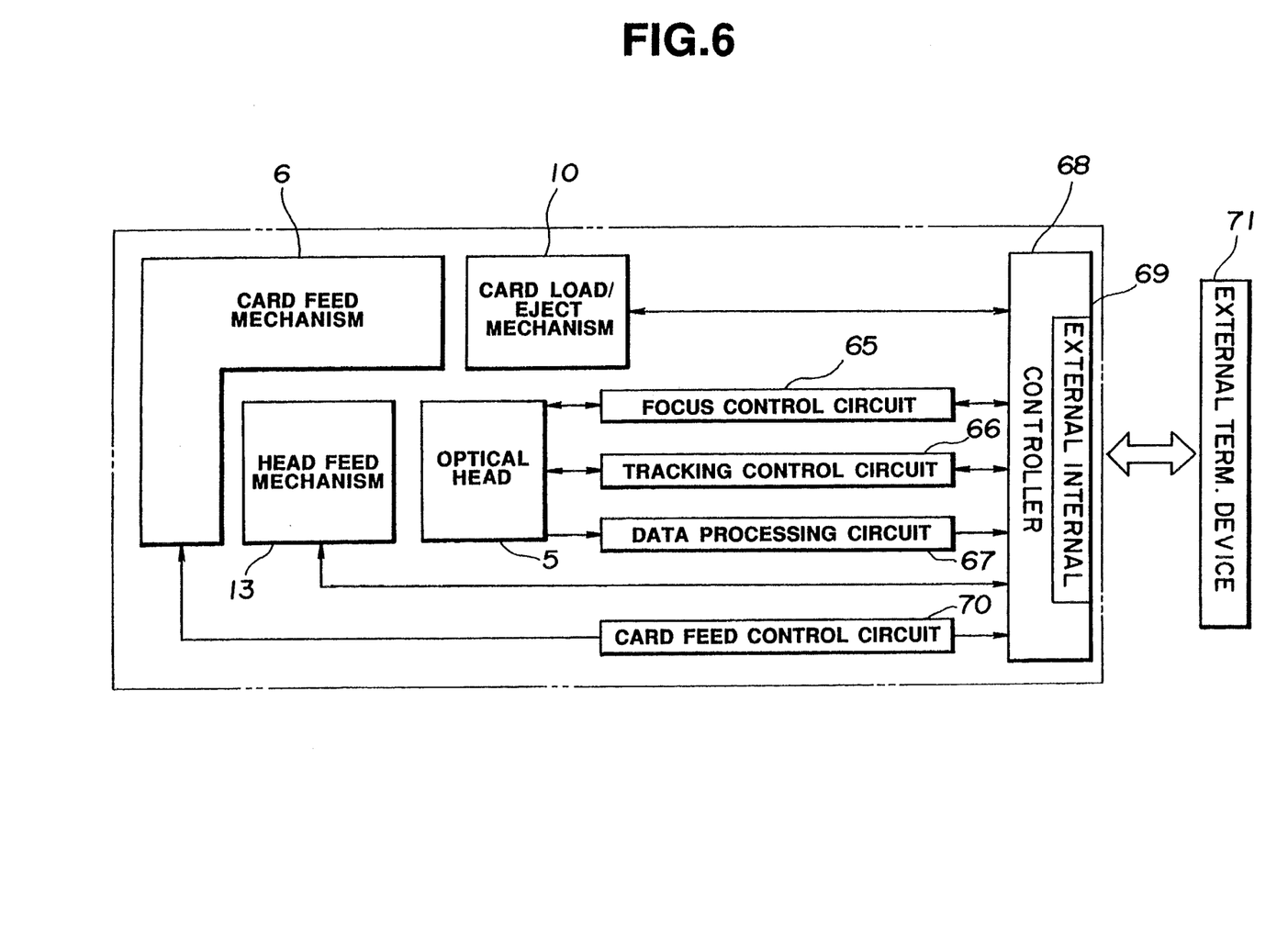
FIG. 6 is a block diagram showing the circuit configuration of the optical recording/reproducing device shown in FIG. 1.

The optical information recording/reproducing device according to the present embodiment, as shown in FIG. 6, comprises a focus control circuit 65, a tracking control circuit 66, a data processing circuit 67, and a card feed control circuit 70 connected to a controller 68 controlling the whole system, in addition to the card feed mechanism 6, the card load/eject mechanism 10, and the head feed mechanism 13.

The optical head 5 detects a track guide arranged on the recording surface of the optical card 8 and produces a servo signal such as a tracking error signal and a focus error signal. In accordance with the servo signal, the focus control circuit 65 and the tracking control circuit 66 execute automatic tracking control.

The controller 68 is electrically connected to the card load/eject mechanism 10, the head feed mechanism 13, and the card feed mechanism 6 via the card feed control circuit 70 and controls the operation of each mechanism at a recording and reproducing time. The controller 68 is connected to an external terminal device 71 via an external interface 69.

Figure 7:
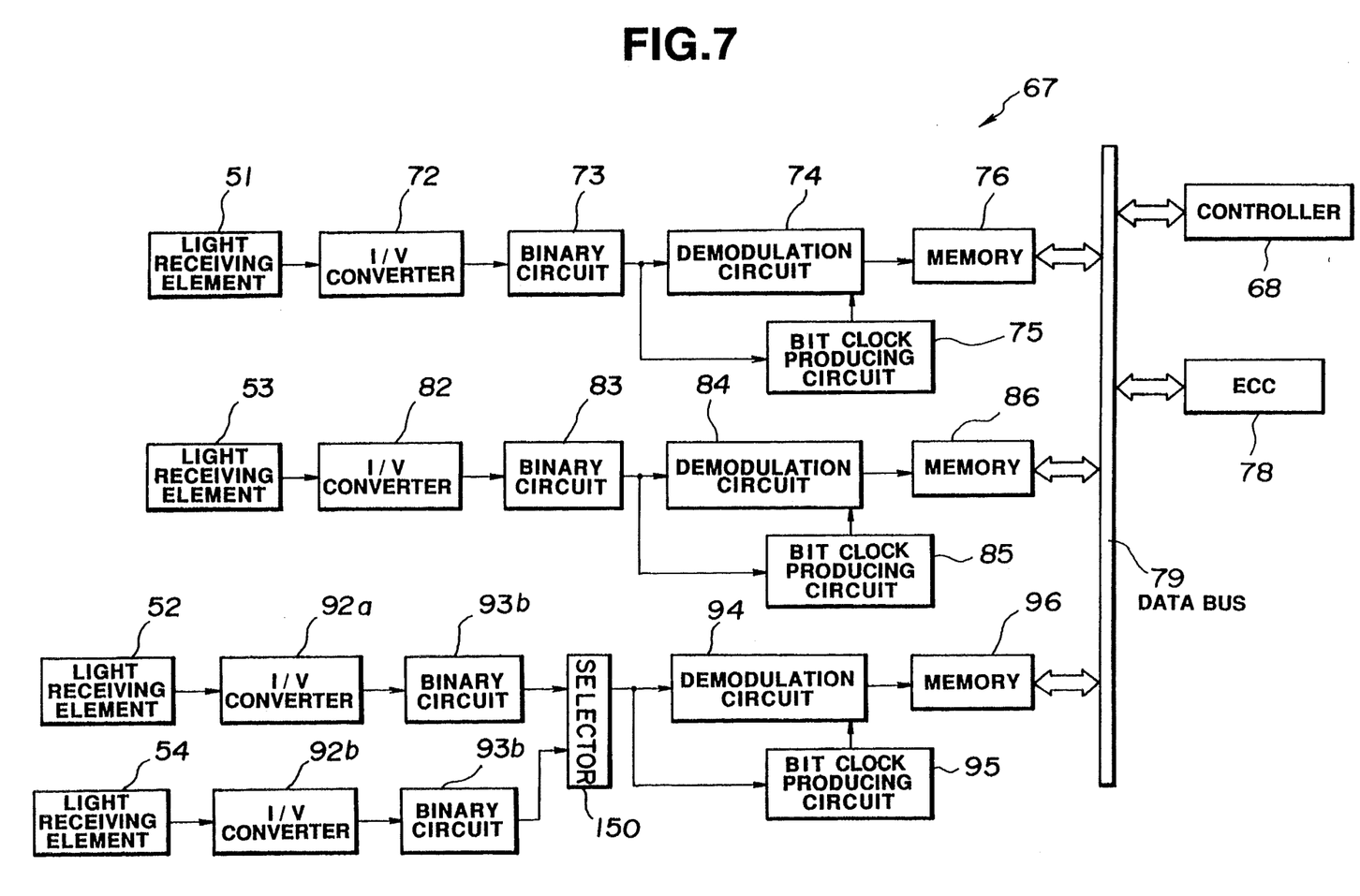
FIG. 7 is a block diagram showing the structure of the data processing circuit shown in FIG. 6.

The data processing circuit 67 constituting a feature of the present invention will be explained with reference to FIG. 7. In FIG. 7, the data processing circuit 67 comprises I/V converters 72, 82, 92a, and 92b for converting respective light signals received by the signal reproducing light receiving elements 51, 53, 52, and 54 into a current and voltage, and binary circuits 73, 83, 93a, and 93b for converting respective outputs of the I/V converters 72, 82, 92a, and 92b into binary signals as a reference level.

The data processing circuit 67 includes a selector 150 for selecting the outputs of the binary circuits 93a and 93b. For example, when the optical card 8 moves forwards, the selector 150 selects the binary circuit 93a. When the optical card 8 moves backwards, the selector 150 selects the binary circuit 93b.

Moreover, the data processing circuit 67 includes bit-clock producing circuit 75, 85, and 95 which produce bit clocks based on binary signals originated from the binary circuit 73 and 83 and the selector 150 and data demodulation circuits 74, 84, and 94 which sample the binary signals originated from the binary circuits 73 and 83, and the selector 150 based on timing of bit clocks output from the bit-clock producing circuits 75, 85, and 95, and which demodulate data using the outcome.

The data processing circuit 67 also includes memories 76, 86, and 96 for storing the demodulated data supplied from the demodulation circuits 74, 84, and 94. The data will be subjected to error correction on each track.

An error correction circuit 78 executes an error correction on data to be error-corrected which is stored on each of the tracks in the memories 76, 86, and 96. The controller 68 controls the error correction circuit 78, and memories 76, 86, and 96 via the data bus 79. Usually a CPU is employed as the controller 68.

Since an optical card has a memory capacity of about 2 k-byte and has an error correction sign redundancy byte per track, using a 4 k×8-bit SRAM is suitable for the memories 76, 86, and 96, in light of cost, memories availability, and access speed.

An explanation will be given below as for the function of the above optical information recording/reproducing device with reference to FIGS. 7 and 8.

Figure 8:
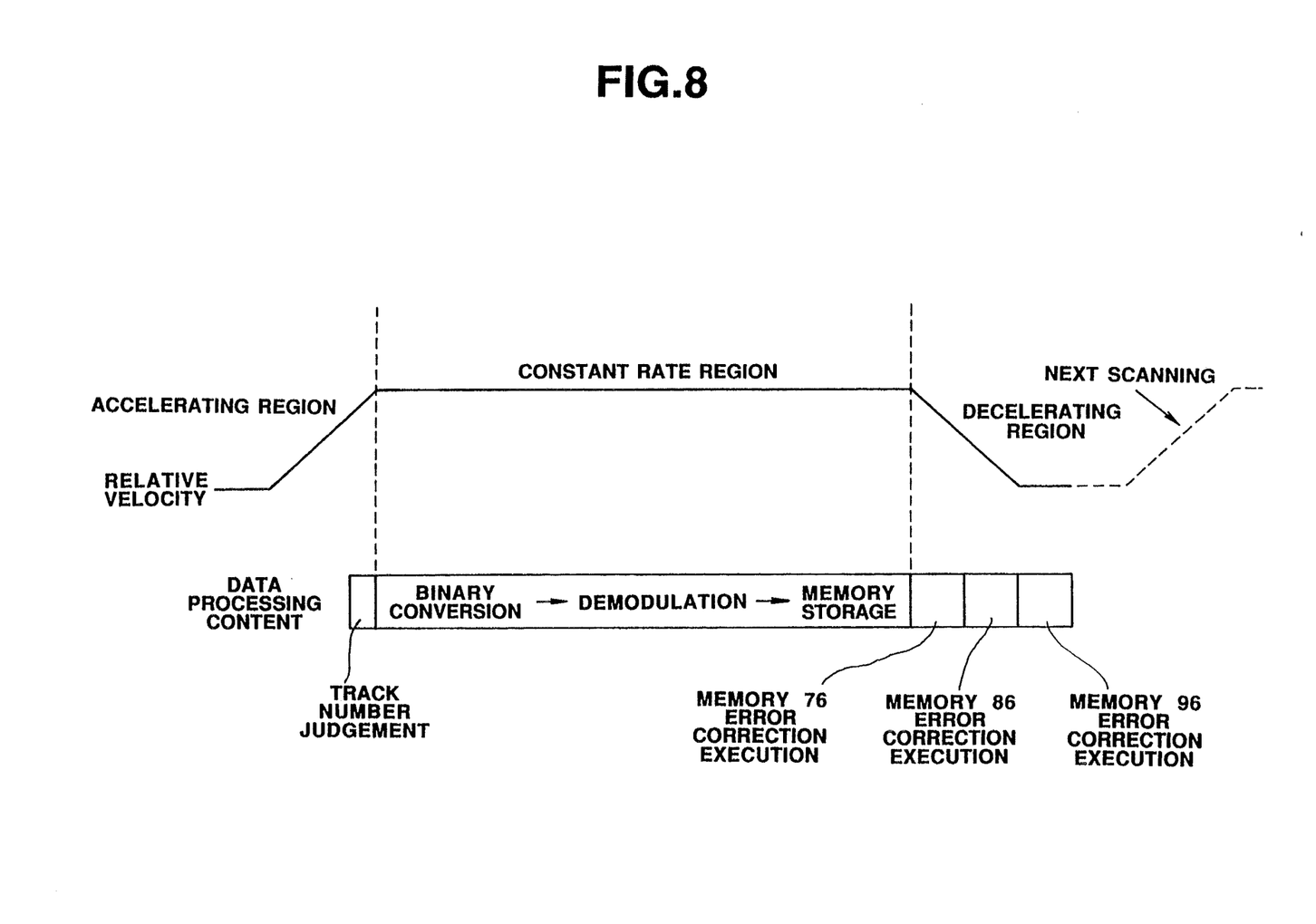
FIG. 8 is an explanatory view explaining a process timing of the data processing circuit shown in FIG. 6.

FIG. 8 shows a relative velocity in a reciprocating movement between the optical head 5 and the optical card 8. In the present embodiment as shown in FIG. 1, the optical head 5 is fixed in the extending direction of the track 28 and the optical card 8 is arranged on the holder 4 so that the holder 4 is reciprocated in the extending direction of the track 28. FIG. 8 shows the process of the data processing circuit 67 shown in FIG. 7.

The holder 4 on which the optical card 8 is mounted is accelerated from a rest state to be settled to a constant rate state until pre-recording track numbers reach the ID portion 27a (see FIG. 2). When a target track is Judged from the track number of the ID portion 27a, data recorded in the data recording region 27 is reproduced as it is. Producing a track number of the ID portion 27a may be performed by a circuit for a single track from among the tracks in FIG. 7 or by circuits for three tracks.

When the optical head 5 reaches the data recording region 27, data appears in the signal reproducing light receiving elements 51, 53, 52, and 54 in FIG. 7. The output signals of these elements are converted into a current and voltage by the I/V converters 72, 82, 92a, and 92b. The I/V converters 72, 82, 92a, and 92b produce binary signals coded at a reference level by the binary circuits 73, 83, 93a, and 93b. Either the binary signals from the binary circuits 73 and 83 or the binary signals from the binary circuits 93a and 93b selected by the selector 150 are input in the bit-clock producing circuits 75, 85, and 95 and the demodulation circuits 74, 84, and 94. The demodulation circuits 74, 84, and 94 sample binary signals based on the bit clocks produced by the bit-clock producing circuits 75, 85 and 95 to execute data demodulation. The demodulated data are stored in the memories 76, 86, and 96 without any change.

The above mentioned operation, as shown in FIG. 8, is performed while the holder 4 is in a constant rate state, or the optical head 5 is passing over the data recording region 27.

When the optical head 5 has passed through the data recording region 27, the holder 4 is decelerated. In this state, the controller 68 directs the error correction circuit 78 to execute an error correction of demodulation data (data to be corrected) stored in the memory 76. The error correction circuit 78 executes an error correction and restores the results in the memory 76 (or the corrected results may be stored in another memory which is prepared). In the same manner, error correction is performed on demodulation data in the memories 86 and 96.

The error correction circuit 78 is generally formed of special hardware. Since the error correction operating time is far shorter than the time it takes for the optical head 5 to pass over the data recording region 27, the error correction can be completed in time of the deceleration period (see FIG. 8) of the holder 4.

In the holder 4, if the velocity of the constant region is 640 mm/sec and the length of the data recording region is 60 mm, a series of processes including binary conversion, demodulation, and memory storage takes about 93.4 msec to perform. However, the error correction operating time is about 5 msec per track at maximum.

Therefore the data processing circuit 67 according to the present embodiment can execute a high speed data reading operation because data reproduction time for three tracks is about 108.4 (=93.4+5×3)msec.

An explanation will be given below about the second embodiment. The second embodiment has similar formation as that of the first embodiment. Only the formation of the optical detector and data processing circuit is different from that of the first embodiment. The same numerals are applied to the same elements, and description of such elements is omitted.

Since the optical information recording reproducing device performs what is known as a blank check when a track to be recorded is scanned prior to recording information on an optical medium and it is Judged whether the track is recordable or not, normal information writing probability is improved.

Figure 9:
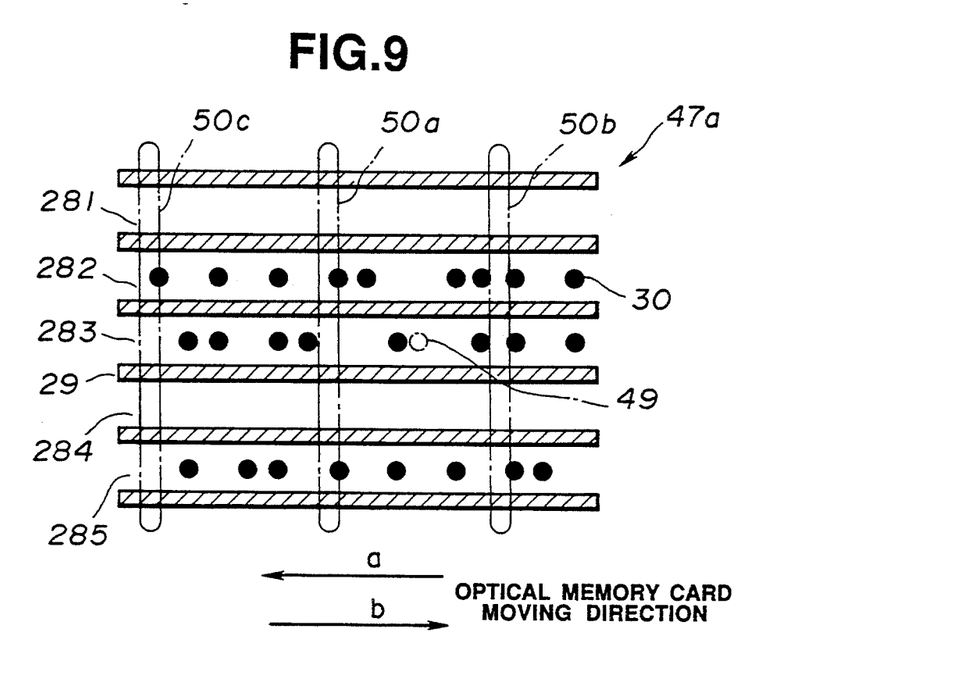
FIG. 9 is an explanatory view explaining a recording optical beam spot and a reproducing optical beam spot on a conventional optical card.

As shown in FIG. 9, the reproducing optical light irradiating the optical card 8 is subjected to a light amount modulation based on a presence or a absence of the track guide 29 and a pit. The diffraction light spots 50a, 50b, and 50c are irradiated, for example, onto five tracks 281, 282, 283, 284, and 285 on the optical card 8 and are reflected rightly from the tracks in the second embodiment in the same manner as that of the first embodiment.

Figure 10:
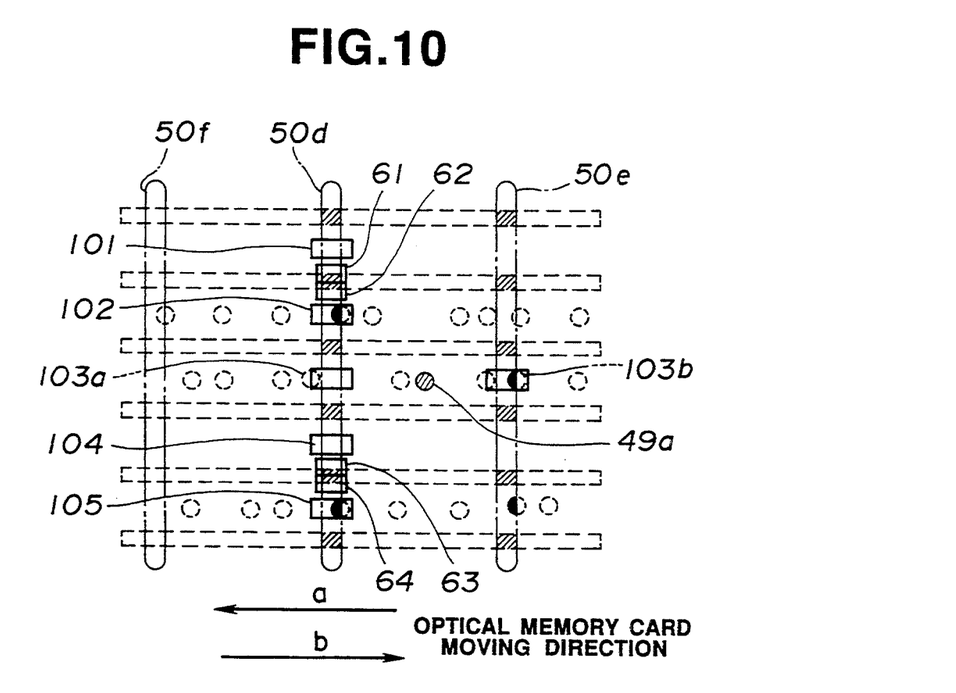
FIG. 10 is an explanatory view explaining the layout of a light receiving element positioned on an optical card.

FIG. 10 shows the spot images 50d, 50e and 50f of the O-order and primary diffraction light beams from a reproducing optical beam formed onto the optical detector 47a in the second embodiment.

Reproducing light receiving elements 101, 102, 103a, 103b, 104, and 105 and the tracking light receiving elements 61, 62, 63, and 64 are arranged on the optical detector 47a. The optical detector 47 in the first embodiment is formed of four reproducing light receiving elements 51, 52, 53, and 54. The optical detector 47a in the second embodiment is formed of six reproducing light receiving elements 101, 102, 103a, 103b, 104, and 105.

The spot image 50d of the O-order diffraction light of the reproducing optical beam is formed on the reproducing light receiving elements 101, 102, 103a, 104, and 105. The reproducing light receiving elements 101, 102, 103a, 104, and 105 simultaneously detect the presence or absence of each pit on the tracks 281, 282, 283, 294, and 285 in FIG. 8 based on change in light amount, convert the light amount change to a current, and output the current.

The reproducing light receiving element 103b detects the presence or absence of a pit on the track 283 based on the spot image 50e of the primary diffraction light of a reproducing optical beam in the same way as that of the reproducing light receiving element 103a, convert it into a current, and output the current.

Figure 11:
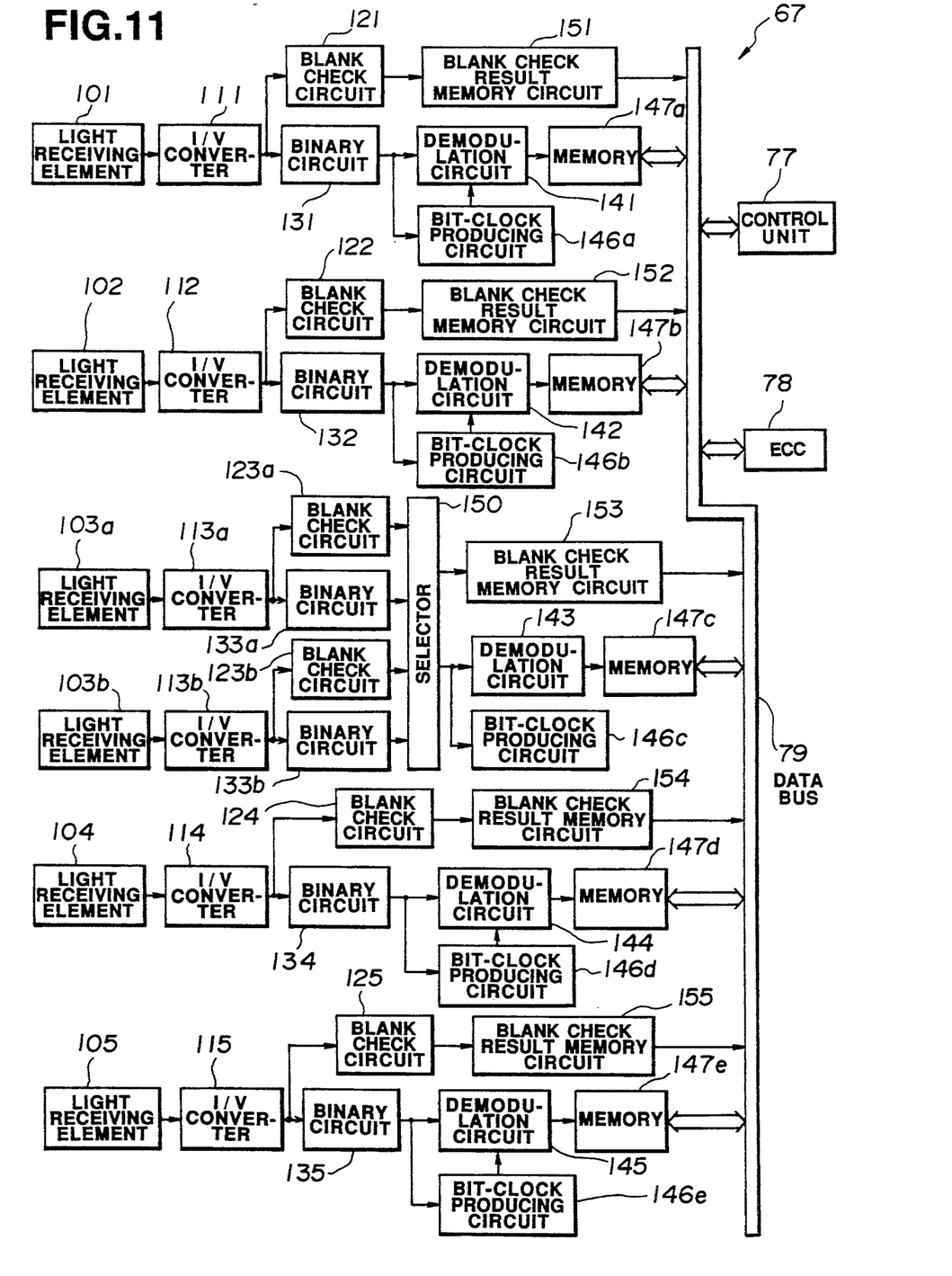
FIG. 11 is a block diagram showing the configuration of a data processing circuit.

FIG. 11 is a block diagram showing the construction of data processing circuit 67a including demodulation circuits and blank check circuits in the optical information recording/reproducing device according to the present embodiment.

As shown in FIG. 11, the I/V converters 111, 112, 113a, 113b, 114, and 115 convert a current output from the reproducing light receiving elements 101, 102, 103a, 103b, 104, and 105 into voltage and the voltage is fed to the blank check circuits 121, 122, 123a, 123b, 124, and 125 and the binary circuits 131, 132, 133a, 133b, 134, and 135.

The outputs of the binary circuits 133a and 133b corresponding to the track 283 is selected by the selector 150 and fed in parallel form, together with binary signals of other tracks, to the demodulation circuits 141, 142, 143, 144 and 145 and the bit-clock producing circuits 146a, 146b, 146c, 146d, and 146e. The outputs of the demodulation circuit 141, 142, 143, 144, and 145 are input to the memories 147a, 147b, 147c, 147d, and 147e in the same way as that of the first embodiment.

Since the bit-clock producing circuits 146a, 146b, 146c, 146d, and 146e and the memories 147a, 147b, 147c, 147d, and 147e are similarly formed as those in the first embodiment, an explanation thereof will be omitted here.

The blank check circuits 121, 122, 123a, 123b, 124 and 125 output the result as to whether each track is blank or not. The result by the blank check circuits 123a and 123b to the track 283 is selected by the selector 150 and then is output in parallel form together with results of the other tracks to store the blank check result memory circuits 151, 152, 153, 154, and 155. The controller 68 can check at high speed by making the blank check result memory circuits 151, 152, 153, 154, and 155 of a semiconductor memory.

Figure 12:
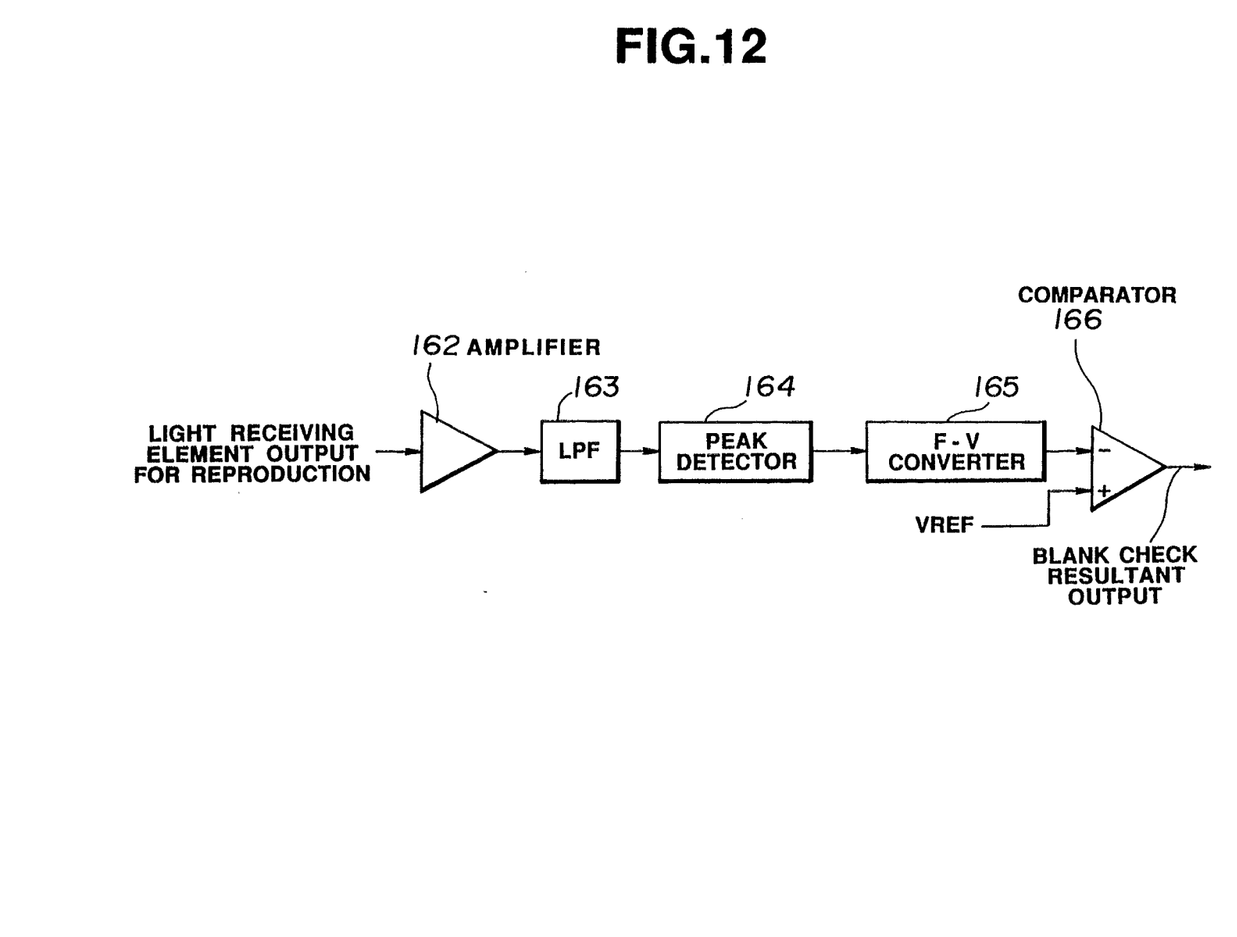
FIG. 12 is a block diagram showing the configuration of the blank check circuit shown in FIG. 11.

FIG. 12 is a block diagram showing an example of the blank check circuit. An amplifier 162 converts the output of the I/V converter to a proper level and the low pass filter (LPF) 163 removes its hf-noise thereof. A peak detector 164 detects a peak point of noise removed light receiving amplifying signal level and produces a pulse signal corresponding to the same. A frequency to voltage (f-v) converter 165 converts the frequency of the pulse to voltage. Then the voltage is compared with reference voltage (Vref) by a comparator 166. When the voltage is the reference voltage and less, the f-v converter 165 outputs a logical "0" to the blank check result memory circuit. When a target track of the f-v converter 165 is a recorded state, the voltage is the reference voltage and over, so that a logical "1" is supplied to the blank check result memory circuit.

The optical information recording/reproducing device according to the present embodiment as shown in FIG. 11, includes a demodulation circuit for each track. At information reproducing time, the information of the tracks 281, 282, 283, 284, and 285 can be demodulated simultaneously and in a parallel form.

In this case, the output of the binary circuit 133a is selected as a binary signal of the track 283 by the selector 150. In the recording and verifying operation at information recording time, when the optical card 8 moves in the direction of the arrow a (see FIG. 10), the pit which is formed by the recording optical beam spot 49 modulated by the recording signal moves in the direction of the spot 50a of the O-order diffraction light of the reproducing optical beam. Thus, when the pit reaches the position of the spot 50a, the reproducing light receiving element 103a on the optical detector 47a senses a change in a light amount due to the pit image. The reproducing light receiving element 103a converts the change in the light amount to a current and outputs the current. The output of the binary circuit 133a is selected by the selector 150 and then modulated to produce a reproducing signal.

While the optical card 8 moves in the direction of the arrow b (see FIG. 10), the pit formed by the recording optical beam spot 49 moves in the direction of the spot 50b caused by the primary diffraction light of a reproducing optical beam. When the spot reaches the position of the spot 50b, the reproducing light receiving element 103b on the optical detector 17 senses a change in light amount due to the pit image. The reproducing light receiving element 103b converts the change in light amount to a current and outputs the current. The output of the binary circuit 133b is selected by the selector 10 and then demodulated to produce a reproducing signal.

Therefore, like the first embodiment, even if the optical card 8 moves in the direction of the arrow a or b in FIG. 10, reproducing signal can be obtained immediately after a recording operation. That is, information recording and a verifying operation can be performed simultaneously, no matter what the moving direction of the optical card 8, reciprocating with respect to the optical head 5, is.

Next, an explanation will be given below as to the blank checking operation.

According to the present embodiment, a blank check of a plurality of tracks can be performed by scanning in an information reproducing operation (including verifying), a recording operation, or a blank check operation on a single track. For example, in the information reproducing operation, the blank check result to the track 283 of the blank check circuit 123a is selected by the selector 150 and stored in a parallel form in the blank check result memory circuits 151, 152, 153, 154, and 155, together with the outputs of the blank check circuits to other tracks. The selector 150 may select the output of the blank check circuit 123b or the output of the reproducing light receiving element 103b. Either output of the reproducing light receiving element 103a or 103b may be used arbitrarily to read information.

Figure 13:
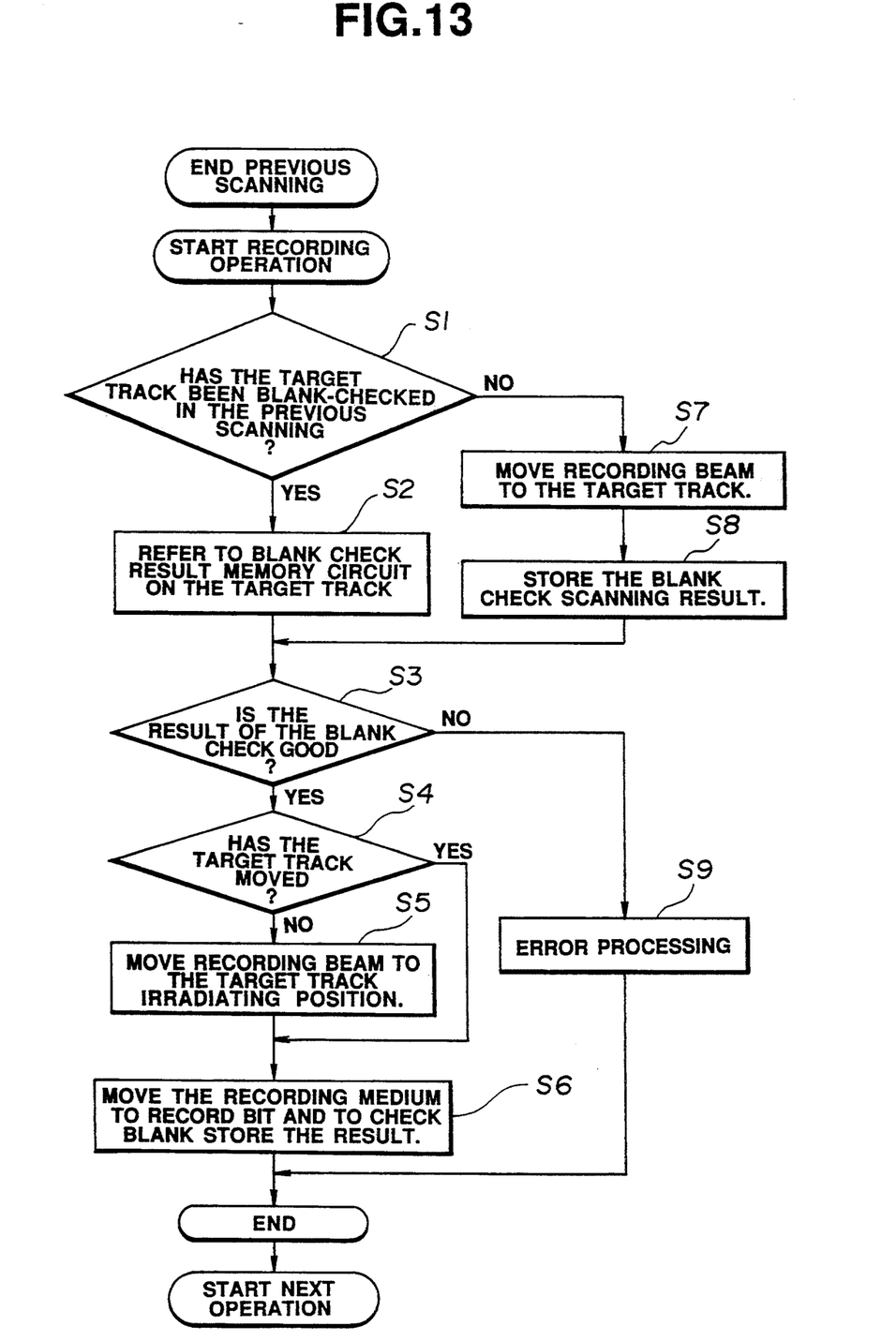
FIG. 13 is a flowchart showing a blank checking process at an information recording time.

Next, a blank check in an information recording time will be explained below. FIG. 13 is a flowchart regarding a blank check at information recording.

At information recording time, in a status Judging result to the track 283, the output of the blank check circuit 63a is selected by the selector 150 when the optical card 8 is moved in the direction of the arrow a. The output of the blank check circuit 123b is selected by the selector 150 when the optical card 8 moves in the direction of the arrow b. The selected check result as well as the check results of the blank check circuits corresponding to the other tracks are stored in a parallel form in the blank check result memory circuits 151, 152,153, 154, and 155.

Here, it is assumed that information recording follows the scanning operation on the track 283 and a next target track for recording is selected from the tracks 281, 282, 283, 284, and 285 which have been blank-checked in the previous scanning.

The controller 68 judges whether a target track for recording has been blank-checked in the previous scanning or not in a step S1.

If the target track has been checked, the controller 68 accesses to the blank check result memory circuit for the target track and verifies the check result in a step S2. The controller 68 can obtain a blank check result at a far higher speed by accessing the blank check result memory circuit for the target track for recording in comparison with that the target track for recording is actually scanned. Thus, a blank check is performed.

In a step S3, the controller 68 verifies whether the blank check result is good or not, that is, a blank state or not.

If it is judged that the check result is blank, the controller 68 verifies whether the current track is a target track or not, that is, the track has moved or not in a step S4. If no, the controller 68 directs the recording optical beam spot to move to a target recording track in a step S5. In a step S6, a recording operation is started at the first scanning. That is, with a pit recording which is performed by the movement of the optical card 8, a blank check is performed. Result of the blank check is stored in the blank check result memory circuit for the recording target track. If yes in the step S4, the process advances to the step S6.

When a recording track is not the track which has been subjected to a blank check by the previous scanning in the step S1 (or has not been checked), the process goes to a step S8. In a step S7, the recording beam is moved to a target track for recording, and blank checking is performed during the next first scanning in the step S8. The result is stored in the blank check memory circuit.

When the result in the step S3 is not blank, an error process is performed in a step S9 and the result is sent to an external terminal device 71.

According to the present embodiment, when sequential recording operations are performed continuously at intervals of the number of tracks which can be blank-checked simultaneously and less, a blank check prior to information recording, information recording and verification can be completed through a one-time scanning. Thus, the effective recording speed substantially doubles in comparison with the conventional two-light source type information recording/reproducing device.

The other structure and functions of the second embodiment are similar to those in the first embodiment.

According to the present embodiment, the first and second reproducing optical beam spots is irradiated onto the front and rear regions of an optical beam spot for information recording along the moving direction of the optical card 8, respectively, and reproducing light receiving elements are arranged at the positions where the first and second spots are formed on the optical detectors. Thus, one-time scanning can simultaneously execute information recording and blank checking of a plurality of tracks (five tracks in the drawing), no matter what the moving direction of the optical card 8 is.

In the present embodiment, a plurality of tracks adjacent to the tracks having recording optical spots are simultaneously irradiated by the reproducing light, and information reproducing light receiving elements, demodulation circuits, blank check circuits, and check result memory circuits are arranged for each track (five tracks in the drawing). Thus, one-time scanning can execute demodulation and blank checking of information of a plurality of tracks (five tracks in the drawing).

For that reason, when the next operation is information recording and the target track is one of blank-checked tracks checked at the preceding track scanning time, the track scanning for the blank checking is not required. Hence, the effective recording speed when a plurality of adjacent or continuous tracks are subjected to a sequential recording operation substantially doubles in comparison with that of the conventional device.

There is also a track divided into a plurality of sectors depending of formats on some optical cards. When information recording/reproducing is performed on each sector of the optical card, it is desirable to provide a blank check result memory circuit for each sector.

In the case of the device of the second embodiment being able to recognize which track has been recorded, in other words, in the device being able to recognize an unrecorded track previously by verifying directory information, one of the unrecorded tracks becomes a target track for blank checking.

When an optical card does not include any directory information or a device does not recognize an unrecorded track, tile blank checking can detect a medium in an abnormal state and prevent an information written track from being overwritten. In other words, in this embodiment, in addition to an abnormal medium detection, the blank checking has a function of preventing data from being overwritten, instead of function of a directory information recognition.

The other advantages are similar to those in the first embodiment.

In the first and second embodiments, the number of tracks irradiated simultaneously by reproducing light spots in the front and rear of a recording optical spot, the number of reproducing light receiving elements, and the layout of the light receiving element should not be limited to those disposed in the present embodiments. For example, the number of reproducing light receiving elements is four in the first embodiment and six in the second embodiment, but should not be limited to these numbers. That is, for example, when the reproducing optical beam spot 50a simultaneously irradiates a plurality of tracks (without being limited to five tracks), the number of reproducing light receiving elements may be the number of the corresponding Irradiated tracks and less. For example, the reproducing light receiving elements 101, 102, 103a, 104, and 105 in the second embodiment (reproducing light receiving elements 51, 52, and 53 in the first embodiment) may be arranged in the positions corresponding to the images of the reproducing light spots 50c.

The reproducing optical beam spot 50b formed on the reproducing light receiving element 103b may not simultaneously irradiate a plurality of tracks (five tracks in the drawing). Namely, the spot 50b may irradiate only the track 283, for example, using another light source if explained in reference to the drawing.

To the contrary, when the reproducing optical beam spot 50b simultaneously irradiates a plurality of tracks, a plurality of information reproducing light receiving elements may be arranged at the focusing spots of the tracks and the irradiated region, in addition to the light receiving elements 103b in the second embodiment (the light receiving element 54 in the first embodiment). A circuit for processing signals from a plurality of additional light receiving elements may be added in the data processing circuit.

The construction of tile data processing circuits is not restricted to the embodiments. For example, the selector may be provided in the output of the I/V converter, and the following circuits may be shared. A selector position is not limited by the above mentioned embodiments. For example, in the second embodiment, the selector may be arranged in any position, if the outputs of the reproducing light receiving elements 103a and 103b (reproducing light receiving elements 52 and 54 in the first embodiment) can be selected. The construction of the data processing circuits may be formed so that the controller 160 can selectively access the memory by providing a demodulation circuit which demodulates the binary data from the reproducing light receiving elements 103a and 103b (reproducing light receiving elements 52 and 54 in the first embodiment) and a memory which stores the data, without providing the selector.

Further, in the embodiments, two reproducing light irradiation regions are formed by irradiating a O-order diffraction light and a primary diffraction light separated from a reproducing optical beam from a single light source. However, the regions may be formed using different light sources and the optical detectors may be formed separately.

In the above stated embodiments, an explanation has been given about an optical information recording/reproducing device using an optical card as an optical recording medium. However, any optical information recording/reproducing device which uses an optical recording medium for optically recording information on a plurality of tracks can be used. For example, an optical information recording/reproducing device which performs information recording/reproducing on a write-once type optical disk, a phase change type optical disk, or an optical magnetic disk where a track having a concentric circle or spiral form is formed may be applied. In this case, since a plurality of optical detectors are arranged radially within an optical head, and a plurality of signal demodulation means for demodulating signals from the plurality of optical detectors are arranged within a data processing circuit, data on a plurality of tracks can be reproduced at high speed.

Moreover, the optical recording medium may be a reproduction-only optical recording medium on which information has been recorded previously.

Moreover, a plurality of information reproduction light receiving elements are discretely arranged on an optical detector. However, a plurality of light receiving elements can be integrally formed and be perpendicular to the direction of the tracks so as to be able to detect light reflected from a plurality of tracks. The plurality of light receiving elements which can output information of each track also may be formed on the optical detector.

According to the present invention, it is obvious that different embodied aspects covering a wide range can be constructed without departing from the spirit and scope of the present invention. This invention should not be limited to the specific embodiments but should be limited to the accompanying claims.

What is claimed is:

1. An optical information recording/reproducing device comprising:
    an optical head including
        a reproducing light source for irradiating a first reproducing optical beam onto n (n>1) tracks of an optical recording medium having a plurality of tracks, said tracks being in an information recordable state or an information recorded state, and
        first light receiving detecting means for receiving a reflected light of said reproducing optical beam from said optical recording medium and outputting information of said tracks of m (n≧m>1) as m detection signals from n tracks simultaneously;
    scanning means for moving said optical recording medium and said optical head relatively to each other; and
    m first signal processing means for processing said m detection signals from said first light receiving detecting means when said scanning means moves said optical recording medium and said optical head relatively to each other.

2. An optical information recording/reproducing device according to claim 1, wherein said first signal processing means comprises
    binary means for converting said detection signal to a binary value and producing a binary signal,
    bit-clock producing means for producing a bit clock from said binary signal,
    sampling means for sampling said binary signal based on said bit clock, and
    memory means for storing the output of said sampling means.

3. An optical information recording/reproducing device according to claim 1, wherein said scanning means comprises
    optical head drive means for driving said optical head perpendicularly to a track direction, and
    optical recording medium drive means for driving said optical recording medium in said track direction.

4. An optical information recording/reproducing device according to claim 3, wherein said first receiving light detecting means comprises
    binary means for converting said detection signal into a binary value and producing a binary signal,
    bit clock producing means for producing a bit clock from said binary signal,
    sampling means for sampling said binary signal based on said bit clock, and
    memory means for storing the output of said sampling means.

5. An optical information recording/reproducing device according to claim 1, 2, 3, or 4, wherein said first receiving return detecting means comprises m light receiving elements for receiving reflected light reflected from a respective number of said n tracks and outputting detection signals.

6. An optical information recording/reproducing device according to claim 1, 2, 3 or 4, further comprising error correction means for performing error correction in said detection signals processed by said m first signal processing means.

7. An optical information recording/reproducing device according to claim 1, 2, 3, or 4, wherein n equals m.

8. An optical information recording/reproducing device according to claim 1, 2, 3, or 4, wherein said optical head includes a recording light source for irradiating a recording beam at a position different from a position where said first reproducing optical beam is irradiated, said recording beam recording information onto at least one of said tracks of n on which said first reproducing optical beam is irradiated.

9. An optical information recording/reproducing device according to claim 8, further comprising second signal processing means for signal-processing said detection signal from said second light receiving detecting means; and wherein said reproducing light source irradiates a second reproducing optical beam for reproducing information of said track on which said recording beam is irradiated, said second reproducing optical beam is irradiated at a different position from that of said first reproducing optical beam in a track direction, said recording beam is irradiated at a position between an irradiating position of said first reproducing beam and an irradiating position of said second reproducing beam, and wherein said optical head includes a second light receiving detecting means for receiving at least a reflected light of said second reproducing optical beam from said track on which said recording beam is irradiated, and for producing said detection signals.

10. An optical information recording/reproducing device according to claim 9, wherein said reproducing light source irradiates a first reproducing optical beam and a second reproducing optical beam separated from a single optical beam on a basis of a diffraction grating.

11. An optical information recording/reproducing device according to claim 10, wherein said selecting means selects said detection signals in accordance with the scanning direction of said scanning means.

12. An optical information recording/reproducing according to claim 9, further comprising selecting means for selecting one of said detection signals produced by said first light receiving detecting means and said detection signals produced by said second light receiving detecting means.

13. An optical information recording/reproducing device according to claim 12, wherein said detection signals originated from said first light receiving detecting means selected by said selecting means is said detection signals of said first light receiving detecting means from said tracks where said second light receiving detecting means receives a light and produces said detection signals.

14. An optical information recording/reproducing device according to claim 9, wherein said first signal processing means comprises
blank checking means for executing a blank check of said tracks of m in accordance with said detection signals of m from said first light receiving detecting means of m; and
blank check memory means for storing results of said blank checking means.

15. An optical information recording/reproducing device according to claim 14, wherein said optical recording medium is an optical card.

16. An optical information recording/reproducing device according to claim 14, further comprising judging means for judging a presence or absence of a blank based on result of a blank check of said track stored in said blank check memory means without scanning for a blank check of said track by said scanning means when said blank Check memory means stores a blank check result of said track recording information using said recording beam.

17. An optical information recording/reproducing device according to claim 16, wherein information is recorded into said tracks by a first scanning operation of said scanning means for recording when said judging means judges that said track memorizing information using said recording beam is blank.

18. An optical information recording/reproducing device according to claim 1, 2, 3, or 4, wherein said optical recording medium is an optical card.

19. An optical information recording/reproducing device according to claim 1, 2, 3, or 4, wherein said first signal processing means comprises
blank checking means for executing a blank check of said tracks of m in accordance with said detection signals of m from said first light receiving detecting means of m, and
blank check memory means for storing results of said blank checking means.

20. An optical information recording/reproducing method suited for an optical information recording/reproducing device comprising:
an optical head including
a reproducing light source for irradiating a first reproducing optical beam onto n (n > 1) tracks of an optical recording medium having a plurality of tracks, said tracks being in an information recordable state or an information recorded state,
first light receiving detecting means for receiving a reflected light of said reproducing optical beam from said optical recording medium and outputting information of said tracks of m (n ≧ m > 1) as m detection signals from n tracks simultaneously, and
a recording light source for irradiating a recording beam at a position different from a position where said first reproducing optical beam so irradiated, said recording beam recording information into at least one of said tracks of n on which said first reproducing optical beam is irradiated;
scanning means for moving said optical recording medium and said optical head relatively to each other; and
m first signal processing means for processing said m detection signals from said first light receiving detecting means when said scanning means moves said optical recording medium and said optical head relatively to each other, said first signal processing means comprising blank checking means for executing a blank check of said tracks of m in accordance with said detection signals of m from said first light receiving detecting means of m, and blank check memory means for storing results of said blank checking means,
said method comprising:
a first step of judging whether a blank check of said track has been completed, said track on which information is recorded using said recording beam;
a second step of referring to a result of a blank check of said track when it is judged that said check has been completed in said first step, said result being stored in said blank check memory means;
a third step of judging whether said track is blank based on a result of a blank check of said track; and
a fourth step of recording information onto said track without scanning for a blank check when said third step has judged that said track is blank.

* * * * *